Aug. 17, 1965
A. W. WILKERSON
3,201,624
TRANSISTORIZED REGULATOR
Filed Nov. 2, 1962
2 Sheets-Sheet 1
FIG. 1
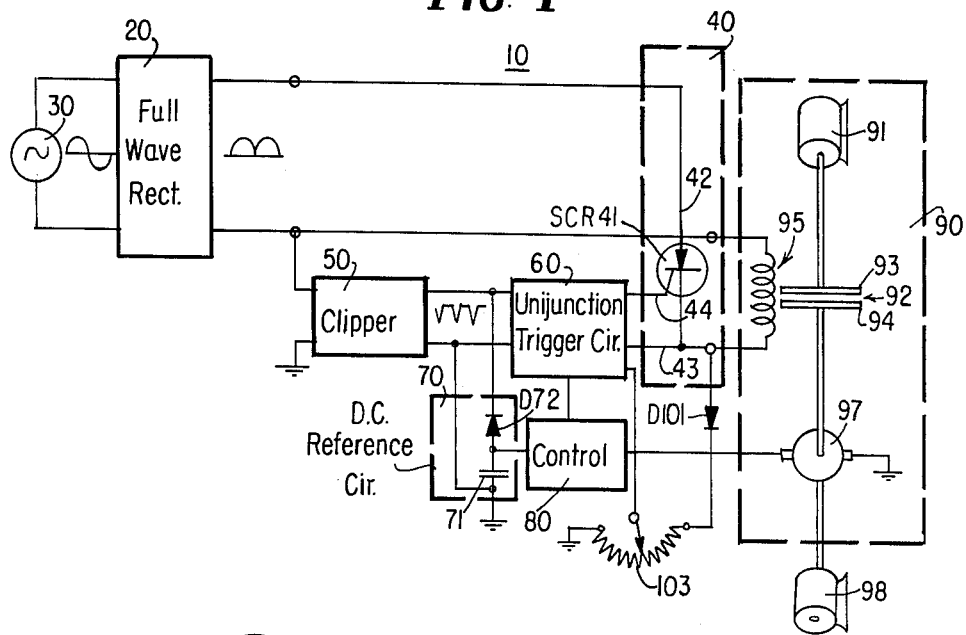
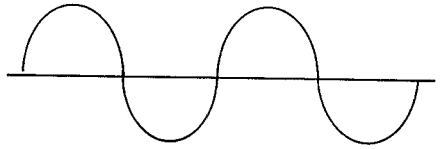
FIG. 3A
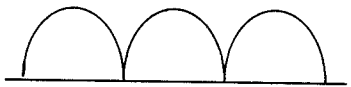
FIG. 3B
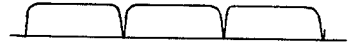
FIG. 3C
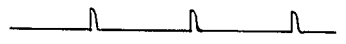
FIG. 3D
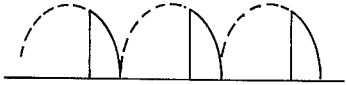
FIG. 3E
INVENTOR.
Alan W. Wilkerson
BY
Byron, Hume, Groen & Clement
ATTYS Aug. 17, 1965 A. W. WILKERSON 3,201,624
TRANSISTORIZED REGULATOR
Filed Nov. 2, 1962 2 Sheets-Sheet 2

INVENTOR.
Alan W. Wilkerson
BY
Byron, Hume, Groen & Clement
ATTYS.

United States Patent Office 3,201,624
Patented Aug. 17, 1965

3,201,624
TRANSISTORIZED REGULATOR
Alan W. Wilkerson, Racine, Wis., assignor to The Louis Allis Company, Milwaukee, Wis., a corporation of Wisconsin
Filed Nov. 2, 1962, Ser. No. 235,006
7 Claims. (Cl. 310—95)

The present invention relates to regulator circuits and particularly to a negative feedback circuit for regulating the amount of power applied to a current load device.

It is a general object of the present invention to provide a new and improved negative feedback circuit for regulating the application of direct current power to a magnetic field clutch.

A more specific object of the invention is to provide a new and improved direct current regulator circuit wherein power is distributed through a gated diode and gating of the diode is achieved through operation of a firing circuit in accordance with a feedback voltage furnished from the output load.

A specific object of the invention is to provide a new and improved direct current regulator circuit including controlled rectifiers of the silicon type in the load circuit wherein the rectifiers are gated from a timing circuit controlled in accordance with a negative feedback voltage furnished from the output load.

A specific object of the invention is to provide a direct current regulator having a full wave rectifier supplying the load device and a controlled rectifier of the silicon type in a series loop, wherein the controlled rectifier is fired from a unijunction transistor pulse generator for which the firing time is controlled in accordance with a negative feedback signal furnished from the output of the load device. In the circuit as contemplated in accordance with the invention, the output of the full wave rectifier is clipped to a given amplitude to supply to the unijunction necessary circuit power that is synchronized with the power furnished to silicon controlled rectifier. Further, the clipped full wave signal is smoothed by operation of a capacitor and rectifier to provide a fixed amplitude reference signal against which the negative feedback signal from the output load device is balanced.

Further objects and features of the present invention relate to the particular arrangement and structure whereby the above identified and other objects of the invention are obtained. The invention, both as to its structure and mode of operation, will be better understood by reference to the following specification and drawings, forming a part thereof, wherein:

FIGURE 1 is a block schematic of the regulating system in accordance with the present invention;

Figure 2:
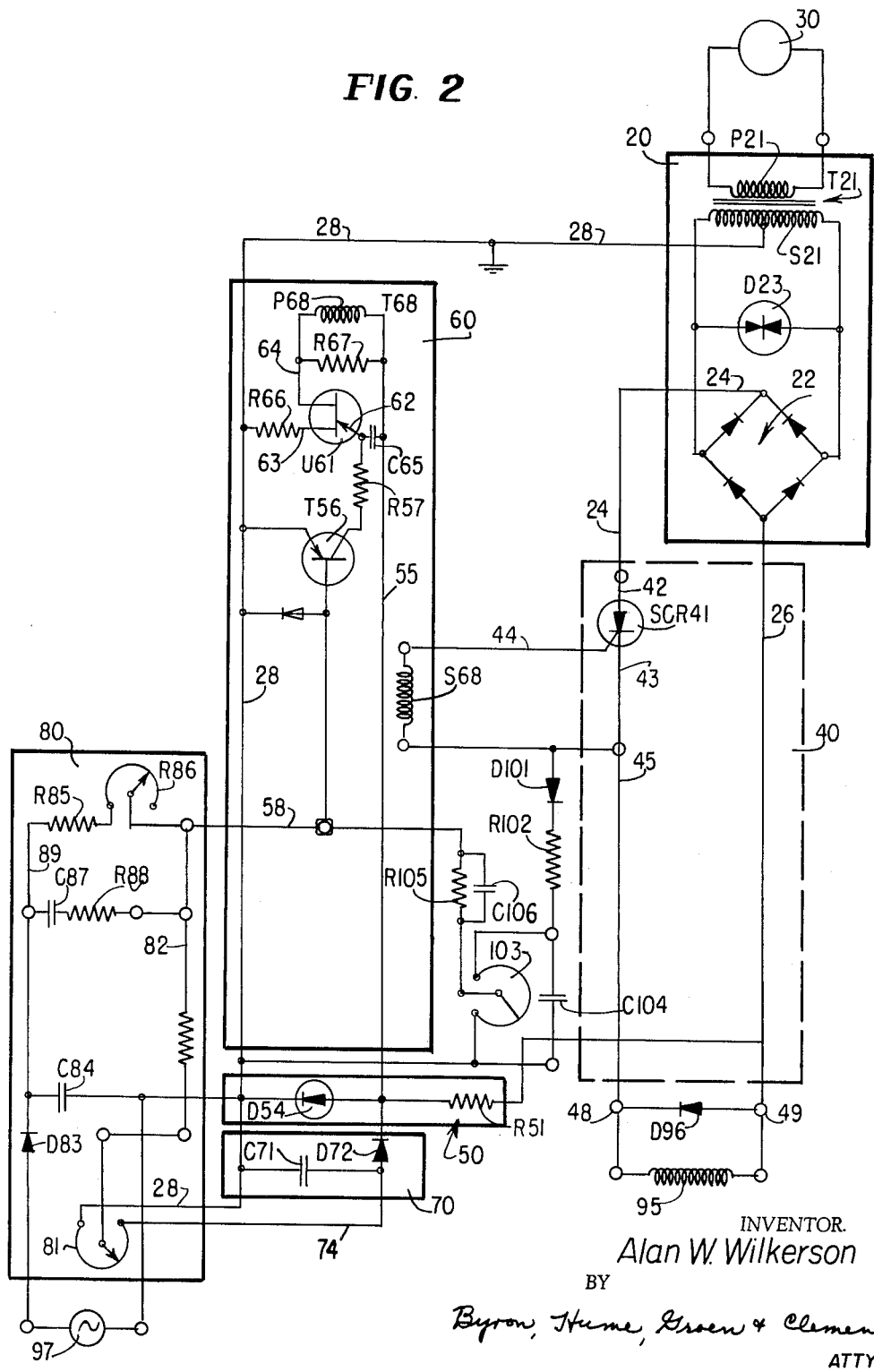
FIGURE 2 is a circuit schematic of a specific arrangement in accordance with the principles of the present invention; and, FIGURES 3A to 3E illustrate wave form conversions that take place in the circuit of FIGURE 2.

Referring now to the drawings, there is shown in FIGURE 1 a preferred block schematic arrangement of regulator circuit 10, a full wave rectifier 20 provided with an alternating current input from a source 30, a controlled firing load circuit 40 provided with the output of the full wave rectifier 20. In addition, there is included an amplitude limiting clipper circuit 50 connected to the output of the full wave rectifier 20 which provides power to a unijunction trigger circuit 60. The output of the latter circuit is employed for purposes of providing control to the firing circuit 40. The clipped full wave rectified output signal from the clipper 50 may also be provided to a smoothing circuit 70 to establish therein a fixed magnitude reference signal which is one component of the input provided to a feedback control circuit 80. Additionally, the feedback control circuit has applied thereto a negative feedback signal derived from an output circuit 90.

For purposes of further explanation, the control firing load circuit 40 is made up essentially of a silicon controlled rectifier SCR41 which is conditioned for conduction during each half cycle between its anode 42 and its cathode 43 and is fired during each half cycle in response to a firing signal applied thereto from the trigger circuit 60 across the cathode 43 and the gate electrode 44. The load of the circuit, here illustrated to be the field winding 95 of a magnetic clutch, is connected in series with the anode and cathode of SCR41.

The D.C. reference circuit 70 consists essentially of a capacitor C71 and a diode D72 connected across the output of the clipper circuit 50 whereby the clipped full wave rectified A.C. signal is smoothed to provide a constant amplitude D.C. reference voltage.

The output circuit 90 is here illustrated to be a magnetic clutch coupler made up basically of a drive motor 91, a magnetic clutch 92, a tachometer generator 97 and a physical load device 98. The eddy current clutch 92 is made up of an input member drum 93 driven from the motor 91 and including a field coil 95, and an output drum member 94 to which the D.C. tachometer 97 and the physical load 98 are connected. The output of the D.C. tachometer generator 97 is fed to the feedback control circuit 80 for purposes of providing a negative feedback signal by means of which the unijunction trigger circuit 60 is controlled.

The circuit illustrated in FIGURE 1 is basically a negative feedback speed control system for an eddy current clutch. This is merely one adaptation of the arrangement in accordance with the present invention and it is understood that it may be applied to other types of systems including torque and acceleration controls.

The specific circuits that go to make up the arrangement of the present invention is best illustrated in the schematic drawing of FIGURE 2. Therein the full wave rectifier 20 is illustrated to include a transformer T21 made up of a primary winding P21 and a center tapped secondary winding S21. The primary winding P21 is energized from the alternating current source 30 and the output of the secondary winding S21 is connected across the input terminals to a diode bridge rectifier 22. In parallel with the secondary winding S21 is a selenium surge protector D23 which functions as a transient voltage spike supressor. A full wave rectified A.C. voltage is derived from the bridge circuit 22 at the output conductors 24 and 26.

The output from the full wave rectifier 20 is applied to the controlled firing load circuit 40 as previously explained with the conductor 24 being connected to the anode 42 of the silicon controlled rectifier SCR41. The cathode 43 extends to the output terminal 48 via the conductor 45. The other output conductor 46 of the full wave rectifier 20 is extended directly to the output terminal 49. The load device here illustrated to be the field coil 95. A diode D96 is connected in parallel with the field coil 95 for purposes of allowing the SCR to regain control when supply voltage goes to zero.

The clipper circuit 50 is shown to include a resistor 51 in series with a Zener-diode D54 between the output conductor 26 of the full wave rectifier 20 and the ground reference conductor 28 extending to the center tap of the secondary winding S21 in the full wave rectifier 20. The output across the Zener-diode D54 is a clipped full wave rectified A.C. signal of an amplitude commensurate with the rating of the diode, here chosen to be approximately 15 volts. The output across the diode D54 is applied in parallel to the unijunction transistor circuit 60 and to the D.C. reference circuit 70.

The unijunction transistor trigger circuit 60 is of a basic unijunction relaxation oscillator design provided with a transistor control input. The unijunction relaxation oscillator is comprised of a unijunction transistor U61 provided with an anode 62, a first base electrode 63 and a second base electrode 64. A charging capacitor C65 is connected between the conductor 55 and the anode 62, a current resistor R66 is connected between the conductor 28 and the first base electrode 63 and a parallel load resistor R67 and an inductive winding P68 are connected between the conductor 55 and the second base electrode 64. The winding P68 is the primary winding of a pulse transformer T68 which includes a secondary winding S68. Additionally, there is included a PNP transistor T56 for which the emitter electrode is connected to the conductor 28, the collector electrode is connected to a resistor R57 extending to the emitter electrode 62 of the unijunction U61. Control to the transistor T56 is provided via the conductor 58 extending from the control circuit 80.

The D.C. reference circuit 70, as previously explained includes the capacitor C71 and a diode D72 connected in series across the conductors 28 and 55. The output across the capacitor C71, which is a relatively constant voltage approximating 15 volts D.C., is extended via conductor 28 and conductor 74 to the resistance element of a potentiometer 81 in the control circuit 80. A portion of this voltage is selected by means of the center tap of the potentiometer 81 and extended via the conductor 82 to the control conductor 58 to establish a base reference voltage for the control conductor 58 extending to the unijunction trigger circuit 60.

In addition, there is included in the control circuit 80 means for providing a feedback signal from the tachometer generator 97 to the control conductor 58. Specifically, this includes a diode rectifier D83 and a capacitor C84 connected in series across the output terminals of the tachometer generator 97. The junction between the capacitor C84 and the tachometer generator 97 is connected to ground potential at conductor 28. The half wave filtered D.C. signal appearing at the junction between the diode D83 and capacitor C84 is applied via conductor 89, a current resistor R85 and a variable resistor R86 to the junction between the conductor 82 and the control conductor 58. The series connected capacitor C87 and resistor R88 connected between conductors 82 and 89 is a shunt circuit that compensates for overshoot during a period of changing voltage on conductor 82.

In addition to the foregoing, there is also shown in the arrangement of FIGURE 2 a sensitivity circuit comprised of a diode D101, a resistor R102 and the resistance element of a potentiometer 103 connected in series across the conductor 45 extending to the field coil 95 and the ground reference conductor 28. A filter capacitor C104 is connected in parallel with the resistance element of the potentiometer 103. The center tap of the potentiometer 103 is connected through a resistor R105 to the conductor 58 and the base electrode of the transistor T56. Additionally, a capacitor C106 is connected in parallel across the resistor R105. This sensitivity circuit provides a negative feedback component from the field coil.

Giving consideration to the operation of the arrangement shown in FIGURE 2, the rectifier 20 provides a full wave rectified alternating current voltage which can be considered to be an unfiltered D.C. voltage of the frequency of 120 cycles which is applied to the SCR41. The SCR41 fires in response to a gating signal applied thereto between its gate electrode 44 and its cathode 43. In order to provide for the SCR41 to regain its full forward blocking ability, there is provided a back rectifier D96 in parallel with the field coil 95. This is necessitated by virtue of the fact that the inductive current maintains itself even after the unfiltered D.C. output from the rectifier 20 has gone to zero. The back rectifier provides a path for the inductive current whenever the supply voltage goes to zero, thereby allowing the current through SCR41 to be interrupted and render the SCR non-conductive.

In the unijunction transistor, the trigger circuit 60, the supply voltage across the conductors 28 and 55 is an unfiltered D.C. of 120 cycle frequency and of an amplitude of approximately 15 volts. The capacitor C65 starts charging at the start of each half cycle and produces a pulse after a time interval depending on the value of resistor R57 and the current flow through the transistor T56. At the end of a pulse cycle the base to base voltage of the unijunction U61 drops to zero and the capacitor C65 discharges the ground through the emitter, whereby the timing of the unijunction pulses are always synchronized with the voltage wave applied to the anode and cathode of SCR41. At the transistor T56 a small current from the base of the transistor produces a much larger current flow from the emitter to collector path thereby increasing some of the charging current flow to the capacitor C65. Increasing the charging current to the capacitor C65 causes earlier firing of the unijunction U61 and of the SCR41 thereby causing a greater average current flow through the field coil 95.

In the control circuit 80 the voltage supplied from the potentiometer 81 to the conductor 82 is a voltage negative relative to the ground reference potential on the conductor 28. The potential picked off on the conductor 89 is positive relative to the voltage on the conductor 82 so that the voltage supplied from the variable resistor R86 bucks the voltage provided from the potentiometer 81. Any sudden change in the differences of the voltage between the conductor 82 and the conductor 89 is compensated for by the RC circuit including the capacitor C87 and R88. The sensitivity circuit including the potentiometer 103 also plays a part in providing a bias control to the unijunction trigger circuit. The voltage provided at resistor R105 to the conductor 58 of the unijunction trigger circuit is of a positive polarity relative to the conductor 28, of a selectable magnitude by virtue of the inclusion of potentiometer 103, and of a variable magnitude depending upon the firing rate of the silicon controlled rectifier SCR41. That is, as the field coil voltage increases so also does the voltage applied across the potentiometer 103 in the sensitivity circuit. Thus, the sensitivity circuit provides a negative feedback signal to the conductor in accordance with the energization provided to the inductive load, which signal acts as a load drop adjustment. Inasmuch as the inductive load 95 maintains a current flow even during non-energization or voltage zero periods and in order to restrict sensing in the sensitivity circuit only to energization periods, the diode D101 is provided. This voltage responsive device blocks and effectively disconnects the sensitivity circuit from the load circuit during non-energization periods so that the negative feedback signal from the sensitivity circuit corresponds only to energization provided to the inductive load. As the sensitivity is decreased by increase in the setting of the potentiometer 103, the feedback signal is decreased causing the feedback regulation to become less stable but providing improved load regulation.

FIGURES 3A, 3B, 3C, 3D and 3E show the various wave forms that occur within the circuit. Specifically, FIGURE 3A demonstrates the alternating voltage wave form from the alternating current source 30, the FIGURE 3B illustrates the full wave rectified voltage derived at the output of the rectifier 20, the FIGURE 3C shows the clipped full wave rectified voltage or the unfiltered D.C. appearing across the conductors 28 and 55 and constitutes the unijunction trigger circuit supply voltage. The FIGURE 3D shows an exemplary output signal derived across the transformer T68 in the trigger circuit 60 and applied to the SCR41. The time occurrence of this pulse during each half cycle of the A.C. signal is dependent upon the control signal applied to the conductor 58 of the trigger circuit and this in turn is dependent upon the basic speed voltage setting at the potentiometer 81 as modified by the feedback voltage from the tachometer generator 97 and the adjustment on the variable resistance R86 and also as modified by the negative feedback voltage from the sensitivity circuit as determined by the field coil voltage and the setting of the potentiometer 103. As the speed setting voltage changes or as the negative feedback voltage from the tachometer generator or from the sensitivity circuit changes the trigger circuit will act to advance or retard the firing signal applied to the transistor T68 and the SCR41. In the exemplary occurrence as shown in FIGURE 3D the SCR41 is fired so as to cause conduction through the field coil of a duration in magnitude as shown in FIGURE 3E. As the firing of the pulse in the transformer T68 is advanced or retarded greater or lesser portions of each half cycle of rectified voltage will be applied to the field coil.

From the foregoing it is clear that there has been provided herein a new and improved regulator circuit which in addition to being compact is very simple and efficient. The full wave rectified voltage from the rectifier circuit 20 is used for purposes of supplying controlled amounts of power to the field coil in a simple SCR firing circuit and is used in addition to derive a constant amplitude unijunction trigger circuit supply voltage that is synchronized to the full wave rectified voltage thereby dictating that conduction through the SCR41 is determined solely by the firing pulse provided from the unijunction trigger circuit. The unfiltered D.C. voltage derived from the full wave rectified signal is also then filtered to provide a constant amplitude reference voltage which is the basis for establishing the speed setting or the operational level of the regulator circuit. This voltage is then modified in accordance with known standards and known methods by negative feedback derived from a tachometer generator and also by a negative feedback sensitivity voltage corresponding to the input power applied to the field coil.

Although the arrangement described herein is at present considered to be preferred, it is understood that variations and modifications may be made therein by those skilled in the art without departing from the scope of the invention and it is intended to cover in the appended claims all such variations and modifications as fall within the true spirit and scope of the invention.

I claim:

1. In a regulating circuit for controlling the amount of power supplied to a load device furnishing output power, the combination of:

a power supply furnishing cyclically fluctuating direct current voltage;
   a load device;
   a gated diode;
   a load circuit including said load device and supplied with power from said power supply through said gated diode in accordance with the gating thereof during each cycle;
   limiter means connected to the power supply for producing a limited amplitude cyclical direct current voltage of the same duration as the cyclically fluctuating direct current voltage;
   a firing circuit energized from the output of said limiter means for providing a gating signal to said diode during each cycle at the instant determined by the magnitude of a control signal furnished thereto;
   means for providing a constant non-fluctuating direct current voltage from the output of said limiter means; and
   control means energized by said direct current voltage to furnish a control signal to said firing circuit.

2. In a regulating circuit for controlling the amount of power supplied to a load device furnishing output power, the combination of:

a supply furnishing a cyclically fluctuating direct current voltage;
   a load device;
   a gated diode;
   a load circuit including said load device and supplied with power from said power supply through said gated diode in accordance with gating thereof during each cycle;
   limiter means connected to said power supply for producing a limited amplitude cyclical direct current voltage of the same duration as said cyclically fluctuating direct current voltage;
   a firing circuit energized from the output of said limiter means for providing a gating signal to said diode during each cycle at an instant determined by the magnitude of a control signal furnished thereto;
   means for providing a constant non-fluctuating direct current voltage from the output of said limiter means; and
   a control signal source including means for tapping a portion of said direct current voltage in accordance with a preferred performance of said load device and including feed back means for providing a signal in accordance with the actual performance of said load device;
   whereby there is provided to said firing circuit a control signal corresponding to the difference between said tapped voltage and feed back voltage.

3. The combination set forth in claim 2 wherein said gated diode is a silicon controlled rectifier and said firing circuit is a unijunction relaxation oscillator.

4. In a regulating circuit for controlling the amount of power supplied to a load, the combination comprising a rectifier bridge circuit energized from an alternating current source for providing a full wave rectified voltage, an inductive load device, a silicon controlled rectifier connected in series loop with said load device and said rectifier bridge circuit for applying portions of said rectifier voltage to said load device, a clipper circuit for providing from said full wave rectified voltage a fixed amplitude voltage of corresponding duration and frequency, a unijunction relaxation oscillator for firing said silicon controlled rectifier during each cyclic period of said rectified voltage in accordance with a composite control signal furnished thereto, said oscillator being supplied power from said clipper means for achieving synchronization with said rectified voltage, a filter circuit for providing a filtered D.C. voltage from said unfiltered D.C. voltage, a potentiometer for selecting a portion of said fixed amplitude voltage as a control signal, feedback means for furnishing from said load device a negative feedback signal corresponding to the performance of said load device, and control means for combining said negative feedback signal in opposition to said first control signal to provide a composite control signal to said oscillator.

5. In a regulating circuit for controlling the amount of power supplied to a load, the combination comprising a rectifier bridge circuit energized from an alternating current source for providing a full wave rectified voltage, an inductive load device, a silicon controlled rectifier connected in series loop with said load device and said rectifier bridge circuit for applying portions of said rectifier voltage to said load device, a clipper circuit for providing from said full wave rectified voltage a fixed amplitude voltage of corresponding duration and frequency, a unijunction relaxation oscillator for firing said silicon controlled rectifier during each cyclic period of said rectified voltage in accordance with a composite control signal furnished thereto, said oscillator being supplied power from said clipper means for achieving sychronization with said rectified voltage, a filter circuit for providing a filtered D.C. voltage from said unfiltered D.C. voltage, a potentiometer for selecting a portion of said fixed amplitude voltage as a control signal, first feedback means for furnishing from said load device a second control signal corresponding to the output performance of said load device, second feedback means for furnishing from said load device a third control signal corresponding to the input performance of said load device, and control means for combining said second and third control signals in opposition to said first control signal to provide a composite control signal to said oscillator.

6. In a regulating circuit for controlling the amount of power distributed to a load, the combination comprising a rectifier bridge circuit energized from an alternating current source for providing a full wave rectified voltage, an inductive load device, a silicon controlled rectifier connected in series loop with said load device and said rectifier bridge circuit for applying portions of said rectified voltage to said load device, a clipper circuit for providing from said full wave rectified voltage an unfiltered D.C. voltage of corresponding duration and frequency, a unijunction relaxation oscillator for firing said silicon control rectifier during each cyclic period of said rectified voltage in accordance with a composite control signal furnished thereto, said oscillator being supplied power from said clipper means for achieving synchronization with said rectified voltage, a filter circuit for providing a filtered D.C. voltage from said unfiltered D.C. voltage, a first potentiometer for selecting a portion of said filtered D.C. voltage as a first control signal, a feedback device for furnishing from said load device a second control signal corresponding to the performance of said load device, a feedback circuit including a unidirectional conduction device and a second potentiometer for selecting a portion of only the voltage applied to said load device as a third control signal, and control means for combining said second and third control signals in opposition to said first control signal to provide a composite control signal to said oscillator.

7. The combination as set forth in claim 6 in which said inductive load device is the field winding of an eddy current clutch and wherein said feedback means is a tachometer device for furnishing voltage in accordance with the driven condition of output member of the eddy current clutch.

References Cited by the Examiner

UNITED STATES PATENTS 3,061,747   10/62   Schlicher _____ 310—95

MILTON O. HIRSHFIELD, *Primary Examiner.*

DAVID X. SLINEY, *Examiner.*